(12) United States Patent
Verma et al.

(10) Patent No.: US 11,232,019 B1
(45) Date of Patent: Jan. 25, 2022

(54) MACHINE LEARNING BASED TEST COVERAGE IN A PRODUCTION ENVIRONMENT

(71) Applicant: Bank of America Corporation, Charlotte, NC (US)

(72) Inventors: Sandeep Verma, Haryana (IN); Pavan Chayanam, Alamo, CA (US); Srinivas Dundigalla, Charlotte, NC (US); Mohan Kakarla, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 9 days.

(21) Appl. No.: 16/922,227

(22) Filed: Jul. 7, 2020

(51) Int. Cl.
*G06F 11/36* (2006.01)
*G06N 20/00* (2019.01)

(52) U.S. Cl.
CPC ...... *G06F 11/3676* (2013.01); *G06F 11/3664* (2013.01); *G06N 20/00* (2019.01)

(58) Field of Classification Search
CPC .. G06F 11/3676; G06F 11/3664; G06N 20/00
USPC .................................................. 717/124–167
See application file for complete search history.

(56) References Cited

U.S. PATENT DOCUMENTS

| | | | |
|---|---|---|---|
| 5,583,983 A * | 12/1996 | Schmitter | G06F 9/4493 717/138 |
| 8,516,308 B1 | 8/2013 | Gill et al. | |
| 9,519,869 B2 | 12/2016 | Hwang | |
| 10,013,334 B1 | 7/2018 | Carey et al. | |
| 2010/0088546 A1 | 4/2010 | Chilimbi et al. | |
| 2016/0034468 A1* | 2/2016 | Hart | G06F 11/3696 707/751 |
| 2018/0330248 A1* | 11/2018 | Burhanuddin | G06N 20/10 |
| 2020/0019488 A1* | 1/2020 | Singh | G06N 3/08 |
| 2021/0081165 A1* | 3/2021 | Deshmukh | G06F 40/143 |

OTHER PUBLICATIONS

Braiek, Houssem Ben, and Foutse Khomh. "On testing machine learning programs." Journal of Systems and Software 164 (2020): 110542.pp. 1-18 (Year: 2020).*

(Continued)

*Primary Examiner* — Satish Rampuria
(74) *Attorney, Agent, or Firm* — Banner & Witcott, Ltd.

(57) ABSTRACT

Aspects of the disclosure relate to machine learning based test coverage in a production environment. A computing platform may retrieve, for a software application, first log data associated with a production environment, and generate a production navigational graph where a node represents a webpage visited by a user, and an edge represents a navigational link between two webpages. Likewise, second log data associated with a testing environment may be retrieved, and a testing navigational graph may be generated, where a node represents a webpage tested by a developer, and an edge represents a navigational link between two webpages. Then, the computing platform may generate a coverage graph indicative of a gap between the navigation activity and the testing activity. Subsequently, the computing platform may provide, via an interactive graphical user interface, the coverage graph, where nodes and edges of the coverage graph are associated with selectable visual objects.

20 Claims, 5 Drawing Sheets

(56) References Cited

OTHER PUBLICATIONS

Ioannides, Charalambos, and Kerstin I. Eder. "Coverage-directed test generation automated by machine learning—a review." ACM Transactions on Design Automation of Electronic Systems (TODAES) 17.1 (2012): pp. 1-21. (Year: 2012).*

Chiba, Zouhair, et al. "Intelligent approach to build a Deep Neural Network based IDS for cloud environment using combination of machine learning algorithms." computers & security 86 (2019): pp. 291-317. (Year: 2019).*

\* cited by examiner

MACHINE LEARNING BASED TEST COVERAGE IN A PRODUCTION ENVIRONMENT

BACKGROUND

Aspects of the disclosure relate to deploying digital data processing systems to manage a performance of a software application. In particular, one or more aspects of the disclosure relate to machine learning based test coverage in a production environment.

Enterprise organizations may utilize various software applications to support their computing infrastructure. Performance such software applications may undergo changes based on modifications to an underlying source code, webpages, and/or navigational links. Ensuring that performance related issues for the software application are properly identified, and timely and targeted error correction steps are performed to ensure a smooth running of the software application in a production environment, and minimize an impact of changes to the source code, webpages, and/or navigational links, to enterprise services, may be highly advantageous to maintain an efficient and stable computing infrastructure. In many instances, however, it may be difficult to perform upgrades with speed and accuracy while also attempting to optimize network resources, bandwidth utilization, and efficient operations of the computing infrastructure.

SUMMARY

Aspects of the disclosure provide effective, efficient, scalable, fast, reliable, and convenient technical solutions that address and overcome the technical problems associated with test coverage in a production environment.

In accordance with one or more embodiments, a computing platform, having at least one processor, and memory, may retrieve, by a computing device and for a software application, first log data associated with user navigation of one or more webpages in a production environment. Subsequently, the computing platform may generate, by the computing device and based on the user navigation, a production navigational graph for the software application, where a node of the production navigational graph may represent a webpage visited by a user, and an edge between two nodes may represent a navigational link between two webpages visited by the user. Then, the computing platform may retrieve, by the computing device and for the software application, second log data associated with testing activity in a testing environment. Then, the computing platform may generate, by the computing device and based on the testing activity, a testing navigational graph for the software application, where a node of the testing navigational graph may represent a webpage tested by a developer, and an edge between two nodes may represent a navigational link between two webpages, where the navigational link has been tested by the developer. Then, the computing platform may generate, based on the production navigational graph and the testing navigational graph, a coverage graph indicative of a gap between the navigation activity and the testing activity. Subsequently, the computing platform may provide, via an interactive graphical user interface, the coverage graph, wherein nodes and edges of the coverage graph are associated with selectable visual objects.

In some embodiments, the computing platform may detect, in the coverage graph, a node visited by the user in the production environment and not tested by the developer in the testing environment. Then, the computing platform may display, by the computing device, the detected node with a first color. In some embodiments, the computing platform may determine that the detected node has been subsequently tested by the developer. Then, the computing platform may display, by the computing device, the detected node with a second color different from the first color.

In some embodiments, the computing platform may detect, in the coverage graph, a link visited by the user in the production environment, wherein the link is associated with an error in the production environment. Then, the computing platform may display, by the computing device, the detected link with a first color indicating the error. In some embodiments, the computing platform may determine that the error associated with the detected link has been subsequently corrected by the developer. Then, the computing platform may display, by the computing device, the detected link with a second color different from the first color.

In some embodiments, the computing platform may receive, via the interactive graphical user interface, an indication of a selection of a selectable visual object associated with a link. Then, the computing platform may display a message from a service call associated with the link.

In some embodiments, the computing platform may receive, via the interactive graphical user interface, an indication of a selection of a selectable visual object associated with a link. Then, the computing platform may display, for a user and a session and via the interactive graphical user interface, a session activity graph indicating user activity during the session.

In some embodiments, the computing platform may receive, via the interactive graphical user interface, an indication of a selection of a selectable visual object associated with a node. Then, the computing platform may display, via the interactive graphical user interface, a portion of the code associated with the node.

In some embodiments, the computing platform may display, via the interactive graphical user interface, a coverage score indicative of the gap between the navigation activity in the production environment and the testing activity in the testing environment.

In some embodiments, the computing platform may associate, with a given link of a plurality of links between the one or more webpages and based on a pattern of traffic for the plurality of links, a first link score indicative of a number of times the given link is traversed in the production environment. Then, the computing platform may associate, with the given link, a second link score indicative of a number of times the given link has an error in the production environment. Subsequently, the computing platform may execute an error correction strategy based on the first link score and the second link score.

In some embodiments, the computing platform may train a machine learning model to determine a first link score indicative of a number of times the given link is traversed in the production environment, and a second link score indicative of a number of times the given link is associated with an error in the production environment. Then, the computing platform may execute an error correction strategy based on the first link score and the second link score.

In some embodiments, the computing platform may associate, with a given webpage of the one or more webpages and based on a pattern of traffic for the one or more webpages, a first webpage score indicative of a number of times the given webpage is visited in the production environment. Then, the computing platform may associate, with the given webpage, a second webpage score indicative of a number of times the given webpage is associated with an error in the production environment. Subsequently, the computing platform may execute an error correction strategy based on the first webpage score and the second webpage score.

In some embodiments, the computing platform may train a machine learning model to determine a first webpage score indicative of a number of times the given webpage is visited in the production environment, and a second webpage score indicative of a number of times the given webpage has an error in the production environment. Then, the computing platform may execute an error correction strategy based on the first webpage score and the second webpage score.

In some embodiments, the computing platform may detect, by the computing device and based on the gap, one or more of a webpage or a link that was not tested in the testing environment.

In some embodiments, the computing platform may detect, by the computing device and based on the gap, a link that was not identified in the testing environment.

In some embodiments, the computing platform may update, based on the first log data, the production navigational graph. Then, the computing platform may update, based on the second log data, the testing navigational graph. Subsequently, the computing platform may update, based on the updated production navigational graph and the updated testing navigational graph, the coverage graph.

In some embodiments, the production environment and the testing environment may be based on one or more of: a type of service, a type of user, and a type of computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
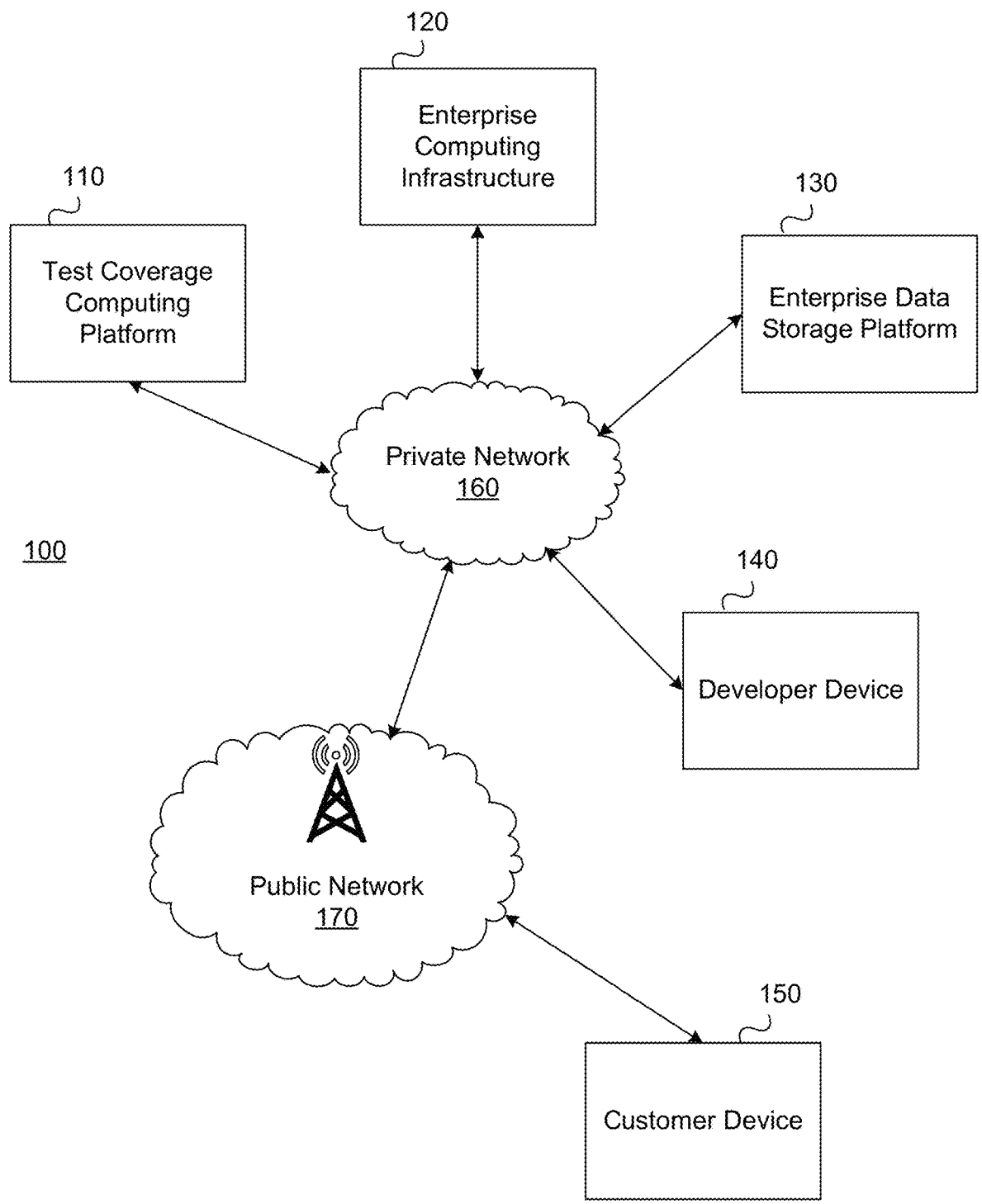
FIGS. 1A and 1B depict an illustrative computing environment for machine learning based test coverage in a production environment.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Organizations may deploy software applications to provide services. Generally, it may be of significant importance for an enterprise to keep such applications running smoothly. Accordingly, software applications are tested before being released in a production environment. However, there may be many ways to navigate the pages, screens of the application, and there may be a multitude of ways in which the menus, tabs, filters, displays, and so forth may function. In generally, it may not be feasible to identify every single navigational link that may exist in a software application. Developers may develop the software with a best-design approach, and testers may test the software to identify errors. However, once the software is released into the production environment, users may detect new paths to navigate the software. As these new paths were previously unknown to testers, these paths were not tested before release. Accordingly, any failures to execute the processes associated with such paths may pose challenges to a smooth functioning of the software. Accordingly, rapid detection of such previously unknown paths, and correction of any run-time errors with speed and accuracy, may be of high significance for the enterprise organization.

In general, there are two methods of testing software testing. White box testing is based on a review of the actual underlying code. This may be time-consuming, and may not enable detection of all possible pages and/or links that me need to be tested. Also, for example, black box testing may be based on knowledge of functionality of the code, without actually reviewing the underlying code. Accordingly, it may be difficult to alter and/or modify specific parts of the code to correct errors. As described herein, a hybrid approach is described. A white box type testing, based on a comparison of production environment logs and testing environment logs, may not require a comprehensive review of the underlying code. However, like in black box testing, an optimal test coverage for the code may be provided without a knowledge of the underlying code.

Accordingly, it may be of high significance for an enterprise organization to devise ways in which to automatically assess an error and create an effective, actionable error correction strategy, and provide recommendations with speed and accuracy. As described herein, the system may automatically enable developers and/or testers to simulate data and paths, and thereby improve test/code coverage by sampling and masking examples from production.

Some aspects of the disclosure relate to parsing production logs to extract customer activities and keep updating a possible screen navigation model. Similarly, testing logs may be parsed to extract developer/tester activities and update the screen navigation model. The screen navigation model may then be utilized to display gaps between the production logs and the testing logs, thereby resulting in a rapid identification of pages and/or links that may need to be tested.

Figure 1B:
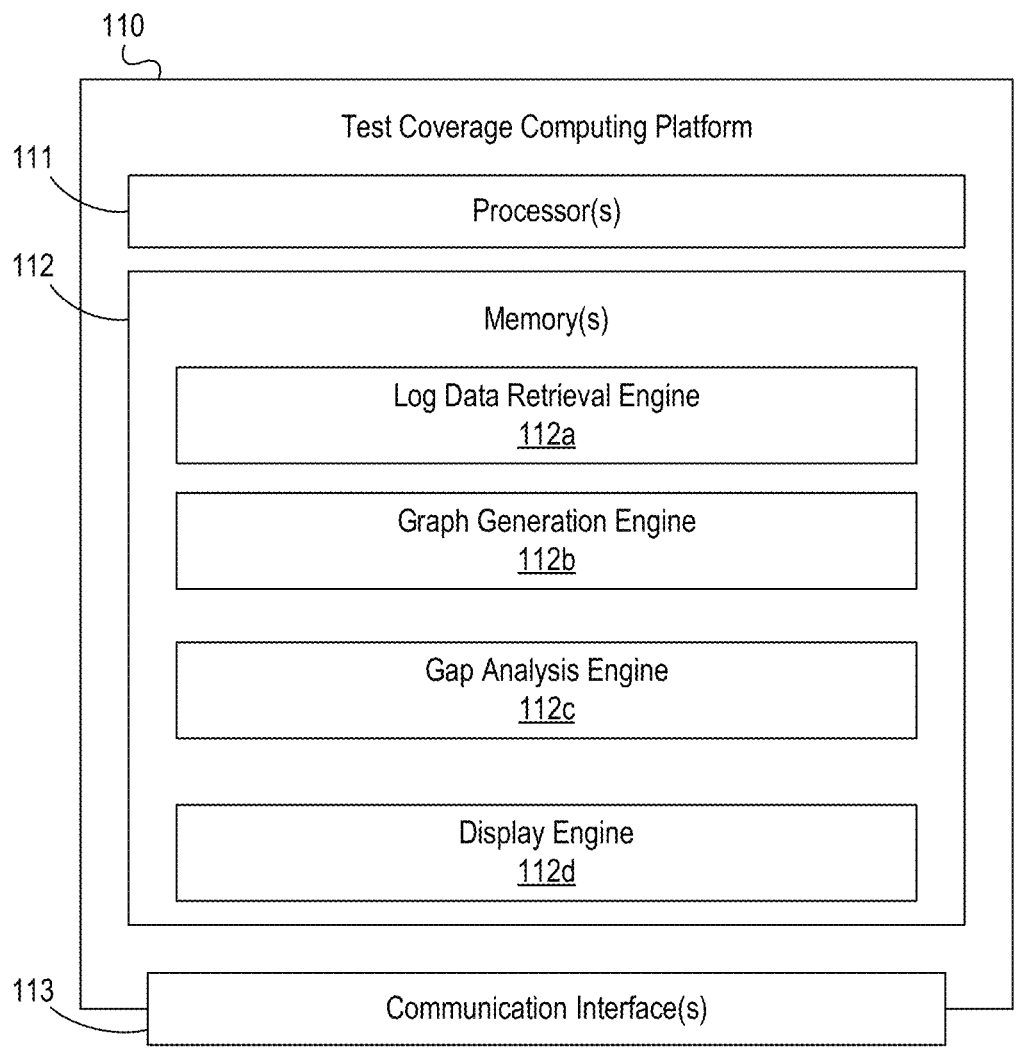

FIGS. 1A and 1B depict an illustrative computing environment for machine learning based test coverage in a production environment. Referring to FIG. 1A, computing environment 100 may include one or more computer systems. For example, computing environment 100 may include a test coverage computing platform 110, enterprise computing infrastructure 120, an enterprise data storage platform 130, developer device 140, and customer device 150.

As illustrated in greater detail below, test coverage computing platform 110 may include one or more computing devices configured to perform one or more of the functions described herein. For example, test coverage computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more applications. For example, enterprise computing infrastructure 120 may be configured to host, execute, and/or otherwise provide one or more applications, such as, for example, banking applications, trading applications, mortgage applications, business loan applications, and/or other applications associated with an enterprise organization. In some instances, enterprise computing infrastructure 120 may be configured to provide various enterprise and/or back-office computing functions for an enterprise organization. For example, enterprise computing infrastructure 120 may include various servers and/or databases that store and/or otherwise maintain business information, information associated with business processes, and so forth. In addition, enterprise computing infrastructure 120 may process and/or otherwise execute actions based on scripts, commands and/or other information received from other computer systems included in computing environment 100. Additionally or alternatively, enterprise computing infrastructure 120 may receive instructions from test coverage computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain log data associated with a production environment, log data associated with a testing environment, and so forth. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

Developer device 140 may be a personal computing device (e.g., desktop computer, laptop computer) or mobile computing device (e.g., smartphone, tablet, wearable device). In addition, developer device 140 may be linked to and/or used by a developer to perform one or more operation associated with a software application, such as, for example, testing, debugging, modifying, releasing a new version, and so forth.

Customer device 150 may be a personal computing device (e.g., desktop computer, laptop computer) or mobile computing device (e.g., smartphone, tablet, wearable device), that may be a source of information. Also, for example, user of customer device 150 may be a customer of an enterprise organization hosting test coverage computing platform 110.

Computing environment 100 also may include one or more networks, which may interconnect one or more of test coverage computing platform 110, enterprise computing infrastructure 120, enterprise data storage platform 130, developer device 140, and/or customer device 150. For example, computing environment 100 may include a private network 160 (which may, e.g., interconnect test coverage computing platform 110, enterprise computing infrastructure 120, enterprise data storage platform 130, developer device 140, and/or one or more other systems which may be associated with an organization, and public network 170 (which may, e.g., interconnect developer device 140 with private network 160 and/or one or more other systems, public networks, sub-networks, and/or the like). Public network 170 may be a cellular network, including a high generation cellular network, such as, for example, a 5G or higher cellular network. In some embodiments, private network 160 may likewise be a high generation cellular enterprise network, such as, for example, a 5G or higher cellular network. In some embodiments, computing environment 100 also may include a local network (which may, e.g., interconnect developer device 140 and one or more other devices with each other).

In one or more arrangements, enterprise computing infrastructure 120, enterprise data storage platform 130, developer device 140, and/or customer device 150, and/or the other systems included in computing environment 100 may be any type of computing device capable of receiving input via a user interface, and communicating the received input to one or more other computing devices. For example, enterprise computing infrastructure 120, enterprise data storage platform 130, developer device 140, and/or customer device 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of test coverage computing platform 110, enterprise computing infrastructure 120, enterprise data storage platform 130, developer device 140, and/or customer device 150, may, in some instances, be special-purpose computing devices configured to perform specific functions.

Referring to FIG. 1B, test coverage computing platform 110 may include one or more processors 111, memory 112, and communication interface 113. A data bus may interconnect processor 111, memory 112, and communication interface 113. Communication interface 113 may be a network interface configured to support communication between test coverage computing platform 110 and one or more networks (e.g., network 160, network 170, a local network, or the like). Memory 112 may include one or more program modules having instructions that when executed by processor 111 cause test coverage computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of test coverage computing platform 110 and/or by different computing devices that may form and/or otherwise make up test coverage computing platform 110. For example, memory 112 may have, store, and/or include a log data retrieval engine 112a, a graph generation engine 112b, a gap analysis engine 112c, and a display engine 112d.

Log data retrieval engine 112a may have instructions that direct and/or cause test coverage computing platform 110 to retrieve, by a computing device and for a software application, first log data associated with user navigation of one or more webpages in a production environment. In some embodiments, log data retrieval engine 112a may have instructions that direct and/or cause test coverage computing platform 110 to retrieve, by the computing device and for the software application, second log data associated with testing activity in a testing environment.

Graph generation engine 112b may have instructions that direct and/or cause test coverage computing platform 110 to generate, by the computing device and based on the user navigation, a production navigational graph for the software application, where a node of the production navigational graph represents a webpage visited by a user, and an edge between two nodes represents a navigational link between two webpages visited by the user. In some embodiments, graph generation engine 112b may have instructions that direct and/or cause test coverage computing platform 110 to generate, by the computing device and based on the testing activity, a testing navigational graph for the software application, where a node of the testing navigational graph represents a webpage tested by a developer, and an edge between two nodes represents a navigational link between two webpages, where the navigational link has been tested by the developer. In some embodiments, graph generation engine 112b may have instructions that direct and/or cause test coverage computing platform 110 to generate, based on the production navigational graph and the testing navigational graph, a coverage graph indicative of a gap between the navigation activity and the testing activity.

Gap analysis engine 112c may have instructions that direct and/or cause test coverage computing platform 110 to analyze, based on the production navigational graph and the testing navigational graph, the gap between the navigation activity and the testing activity.

Display engine 112d may have instructions that direct and/or cause test coverage computing platform 110 to provide, via an interactive graphical user interface, the coverage graph, wherein nodes and edges of the coverage graph are associated with selectable visual objects. In some embodiments, display engine 112d may have instructions that direct and/or cause test coverage computing platform 110 to display, via the interactive graphical user interface, a coverage score indicative of the gap between the navigation activity in the production environment and the testing activity in the testing environment.

Generally, an enterprise organization may deploy a web and/or mobile application to provide services to a customer base. For example, an enterprise organization hosting enterprise computing infrastructure 120 may provide a mobile banking application. Such an application may provide a customer an ability to log in to their account, review account information, deposit checks, transfer money, review a credit rating, review and/or utilize offers from vendors, change login credentials, update account information, and so forth. The mobile application may provide one or more tabs, menu items, and so forth, to provide features to the customer. Accordingly, the mobile application may include one or more pages, and a plurality of links between the pages. Depending on a type of software application or web resource, there may be anywhere from a few hundred to millions of nodes. Also, for example, there may be multiple links between two nodes. The term "webpage" as used herein may generally be used interchangeably with a user interface component, and may generally refer to a component of a software application that provides a user with visual interfaces, scenarios, selectable visual objects, views, requests, and/or scenarios. For example, a webpage or a user interface component may be a page in a web resource, or a page or a screen in a software application. For example, a user interface component may be a page on the world wide web ("WWW"). Also, for example, a user interface component may refer to different pages displayed in a software and/or mobile application.

For example, a first customer may login from a main page of the mobile application, and may navigate to a page displaying a balance in a checking account, before proceeding to a page that enables the first customer to transfer money. Also, for example, a second customer may login from the main page, and navigate directly to the page that enables the second customer to transfer money. Also, for example, a third customer may login from the main page, navigate to a page that enables the third customer to deposit a check, and may then navigate to the page that enables the third customer to transfer money. Accordingly, all three customers navigated from the home page to the page that allows money transfer, but followed different links to get there.

When a software application (e.g., a mobile application) is developed, a developer may write the code to create a functionality. Also, for example, one or more webpages may be created to host services, and links between these webpages may be created. Prior to release of the software application, the developer may test one or more of the webpages and associated links. However, in general, for a complex software application, it may not be feasible to identify and/or test every webpage, or every link. Accordingly, when the software application is released and made available to a customer, activities in the production environment may reveal issues with webpages and/or links. An ability to quickly identify such errors and/or performance issues may be of high significance to the enterprise organization in order to provide a smooth and seamless customer experience.

In some embodiments, test coverage computing platform 110 may retrieve, by a computing device and for a software application, first log data associated with user navigation of one or more webpages in a production environment. Customer activity in the production environment may be monitored and logged. For example, when a customer logs in, a session identifier may be generated for the particular session. As the customer navigates the application and visits various webpages and follows various links, each such activity may be logged as first log data, including, for example, a time of activity, an error code associated with the activity, any service calls made as a result of the activity, and so forth. A "service call" as used herein, may generally refer to code that may be called and/or executed when following a link from one webpage to another.

Such logged data may be stored in an enterprise storage platform (e.g., enterprise storage platform 130). In some embodiments, test coverage computing platform 110 may retrieve the first log data from the enterprise storage platform (e.g., enterprise storage platform 130). In some embodiments, test coverage computing platform 110 may retrieve the first log data directly from the software application in production. For example, as a customer navigates the software application, test coverage computing platform 110 may retrieve the first log data in real-time.

Generally, a software application may be configured for a variety of devices with various operating platforms. Also, for example, different aspects of a software application may be available to different customers. For example, a customer who has a checking account may be able to navigate a first aspect of the software application that provides features associated with checking account. As another example, a customer who has a trading account may be able to navigate a second aspect of the software application that provides features associated with trading account. In some embodiments, one or more webpages, and/or links between webpages, may be common to the first aspect and the second aspect.

In some embodiments, test coverage computing platform 110 may generate, by the computing device and based on the user navigation, a production navigational graph for the software application, where a node of the production navigational graph may represent a webpage visited by a user, and an edge between two nodes may represent a navigational link between two webpages visited by the user. For example, a first customer may login from a main page of the mobile application, and may navigate to a page displaying a balance in a checking account, before proceeding to a page that enables the first customer to transfer money. Accordingly, a first node may represent the main page, a second node may represent the page displaying the balance, and a third node may represent the money transfer page. A first edge may be associated with the link from the main page to the page displaying the balance, and a second edge may be associated with the link from the page displaying the balance to the money transfer page.

Also, for example, a second customer may login from the main page, and navigate directly to the page that enables the second customer to transfer money. Accordingly, a third edge may be associated with the link from the main page to the money transfer page. Also, for example, a third customer may login from the main page, navigate to a page that enables the third customer to deposit a check, and may then navigate to the page that enables the third customer to transfer money. Accordingly, a fourth node may represent the check deposit page. Also, for example, a fourth edge may be associated with the link from the main page to the check deposit page, and a fifth edge may be associated with the link from the check deposit page to the money transfer page.

In some embodiments, test coverage computing platform 110 may retrieve, by the computing device and for the software application, second log data associated with testing activity in a testing environment. For example, as a developer tests a code underlying a software application, details of such activity may be captured. For example, second log data may indicate whether a page and/or a link has been tested by the developer. In some embodiments, test coverage computing platform 110 may retrieve first log data and second log data, and may utilize natural language processing (NLP) to parse the logs. For example, test coverage computing platform 110 may parse the logs and identify whether a page and/or a link has been tested by the developer.

In some embodiments, test coverage computing platform 110 may generate, by the computing device and based on the testing activity, a testing navigational graph for the software application, where a node of the testing navigational graph may represent a webpage tested by a developer, and an edge between two nodes may represent a navigational link between two webpages, where the navigational link has been tested by the developer. As described herein, test coverage computing platform 110 may identify whether a page and/or a link has been tested by the developer.

In some instances, the testing activity may have tested pages corresponding to bill pay and funds transfer. Accordingly, test coverage computing platform 110 may include a node for bill pay and another node for funds transfer in the testing navigational graph. However, a page corresponding to check deposit may not have been tested. Accordingly, there may be no node corresponding to check deposit. However, in the production environment, a customer may have navigated to the check deposit page. Accordingly, a node corresponding to check deposit may be included in the production navigational graph. Identifying such gaps between production activity and testing activity is a challenging task. However, as described herein, a fast, efficient and reliable process is described that ensure identification of the gaps.

In some embodiments, test coverage computing platform 110 may generate, based on the production navigational graph and the testing navigational graph, a coverage graph indicative of a gap between the navigation activity and the testing activity. For example, the coverage graph may be a combination of the production navigational graph and the testing navigational graph, and may highlight the differences between these graphs. For example, the coverage graph may include nodes for bill pay, funds transfer, and check deposit. In some embodiments, the node for check deposit may be highlighted to indicate that it has been visited by a user in the production environment, but was not tested in the testing environment. Similarly, any links that are visited in the production environment, and that were not tested in the testing environment, may be highlighted.

In some embodiments, test coverage computing platform 110 may provide, via an interactive graphical user interface, the coverage graph, where nodes and edges of the coverage graph are associated with selectable visual objects. For example, the interactive graphical user interface may provide one or more menu options, selectable tabs, icons, and so forth. In particular, the nodes and edges of the coverage graph may be displayed as selectable visual objects. For example, activities such as, for example, hovering over a node, clicking on the node, and so forth, may display information associated with the node. Also, for example, hovering over a link, clicking the link, and so forth, may display information associated with the link.

Figure 2:
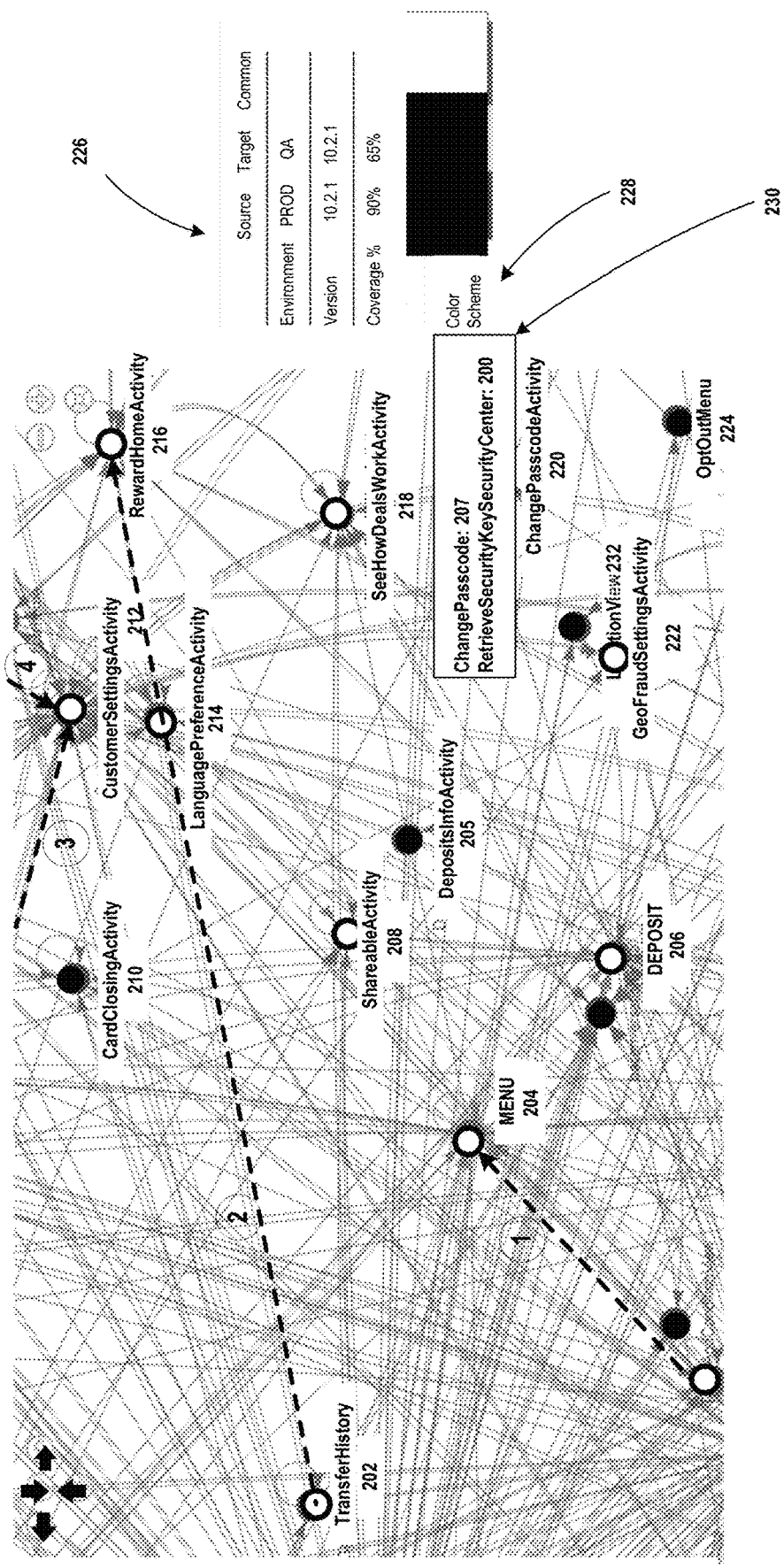
FIG. 2 depicts an illustrative coverage graph for machine learning based test coverage in a production environment.

FIG. 2 depicts an illustrative coverage graph for machine learning based test coverage in a production environment. Referring to FIG. 2, a number of nodes and edges displayed are for illustrative purposes only. Generally, FIG. 2 depicts a portion of a coverage graph. In some embodiments, the entire coverage graph may be displayed and a user may zoom in to particular portions of the coverage graph. Also, for example, in some instances, the coverage graph may be large and portions of it may be available for display. In some embodiments, the interactive graphical user interface may provide selectable features that may enable options to filter the data presented. For example, the coverage graph may be provided for specific types of devices, operating systems, types of users, types of applications, types of accounts, and so forth. In some embodiments, the coverage graph may be provided for data from a certain period of time. For example, the first log data may be filtered based on a time window, and the coverage graph may be based on such filtered data.

Generally, the production environment and the testing environment may be based on one or more of: a type of service, a type of user, a type of operating environment, and a type of computing device. Accordingly, the first log data and the second log data may depend on such factors. Consequently, the production navigational graph, the testing navigational graph, and the coverage graph may also depend on such factors.

As illustrated, one or more nodes corresponding to pages are displayed. For example, a node for TransferHistory 202 may represent a page that provides information associated with a history of fund transfers. A node for Manu 204 may represent a page that provides information associated with a main menu for the software application. A node for Deposit 206 may represent a page that provides information associated with deposits. As another example, a node for DepositsInfoActivity 205 may represent a page that provides information associated with information associated with deposit activity. Another node for ShareableActivity 208 may represent a page that provides information associated with activities that enable sharing of user information. CardClosingActivity 210 may represent a page that provides information associated with activities that enable a user to close an account associated with a card (e.g., a credit card, a cash rewards card, a debit card, and so forth). CustomerSettingsActivity 212 may represent a page that provides information associated with activities related to customer settings. LanguagePreferenceActivity 214 may represent a page that provides information associated with activities related to a customer's language preferences. As another example, RewardHomeActivity 216 may represent a home page that provides information associated with rewards programs. Likewise, nodes such as SeeHowDealsWorkActivity 218, ChangePasscodeActivity 220, GeoFraudSettingsActivity 222, OptOutMenu 224 and LocationView 232, may be provided.

As indicated, some nodes may be represented with a filled in circle (e.g., filled in with a first color), and some nodes may be represented with a circle that is not filled in (or filled in with a second color different from the first color). As described herein, nodes that are represented with a filled in circle indicate nodes that were visited in the production environment, but that were not tested in the testing environment. For example, DepositsInfoActivity 205, CardClosingActivity 210, LocationView 232, and OptOutMenu 224 are indicated as nodes that were not tested in the testing environment, but that were visited in the production environment.

Also, for example, nodes represented with a circle that is not filled in indicate nodes that were visited in the production environment, but that were tested in the testing environment. For example, TransferHistory 202, Menu 204, Deposit 206, ShareableActivity 208, CustomerSettingsActivity 212, LanguagePreferenceActivity 214, RewardHomeActivity 216, SeeHowDealsWorkActivity 218, and GeoFraudSettingsActivity 222 are indicated as nodes that were tested in the testing environment, and that were visited in the production environment.

Also, for example, an arrow from one node to another indicates a navigational path from one webpage to another. In some embodiments, a link represented by a dashed arrow (or an arrow displayed in a first color) may indicate that the link was visited in the production environment, but was not tested in the testing environment. For example, dashed arrows 1, 2, 3, and 4 are illustrative examples. Also, for example, a solid arrow (or an arrow displayed in a second color different than the first color) may indicate that the link was visited in the production environment, and was not tested in the testing environment.

In some embodiments, test coverage computing platform 110 may detect, in the coverage graph, a node visited by the user in the production environment and not tested by the developer in the testing environment. For example, test coverage computing platform 110 may identify nodes represented by filled-in circles in the illustrated example of the coverage graph. Then, test coverage computing platform 110 may display, by the computing device, the detected node with the first color. In some embodiments, test coverage computing platform 110 may determine that the detected node has been subsequently tested by the developer. Then, test coverage computing platform 110 may display the detected node with a second color different from the first color. For example, DepositsInfoActivity 205 may be identified as a node that was visited by the user in the production environment and that was not tested by the developer in the testing environment. Accordingly, a notification may be provided to a developer, and the developer may test DepositsInfoActivity 205. Accordingly, test coverage computing platform 110 may convert DepositsInfoActivity 205 from a filled in circle (e.g., a first color) to a circle that is not filled-in (or filled-in with a second color).

In some embodiments, test coverage computing platform 110 may detect, in the coverage graph, a link visited by the user in the production environment, where the link is associated with an error in a service call in the production environment. For example, test coverage computing platform 110 may identify the dashed arrows in the illustrated example of the coverage graph. Then, test coverage computing platform 110 may display, by the computing device, the detected link with a first color indicating the error. In some embodiments, test coverage computing platform 110 may determine that the error in the service call associated with the detected link has been subsequently corrected by the developer. Then, test coverage computing platform 110 may display, by the computing device, the detected link with a second color different from the first color. For example, arrow 2 may be identified as a link that was associated with an error in the production environment. Accordingly, a notification may be provided to a developer, and the developer may test the link represented by arrow 2. Accordingly, test coverage computing platform 110 may convert arrow 2 from a dashed line (e.g., a first color) to a solid line (e.g., a second color).

In some embodiments, a color scheme 228 may indicate a legend for colors utilized to represent nodes and/or links. In some embodiments, a third color may be utilized to indicate nodes and/or links that may be introduced in the testing environment, but that have not been released in the production environment.

In some embodiments, test coverage computing platform 110 may detect, by the computing device and based on the gap, one or more of a webpage or a link that was not tested in the testing environment. For example, test coverage computing platform 110 may detect that DepositsInfoActivity 205 was not tested in the testing environment. In some embodiments, test coverage computing platform 110 may detect, by the computing device and based on the gap, a link that was not identified in the testing environment. For example, arrow 2 may be a link that was detected in a production environment because of user activity. Generally, it may not be possible for a developer to test and/or identify every path that may be navigable from one node to another. In many instances, some such links may exist, but may never be utilized in the production environment. Accordingly, when a link is utilized in the production environment, the link may get highlighted as a link that has significance, and may accordingly be flagged for further testing and/or evaluation.

In some embodiments, test coverage computing platform 110 may display, via the interactive graphical user interface, a coverage score indicative of the gap between the navigation activity in the production environment and the testing activity in the testing environment. For example, test coverage computing platform 110 may display information in a tabular format 226. As indicated, a source of a comparison for log data may be the first log data from the production environment ("PROD"), and a target of the comparison for log data may be the second log data from the testing or quality assurance ("QA") environment. A version of the software application in both environments may be 10.2.1. As indicated, a coverage of 90% in the production environment indicates that 90% of the pages and/or links have been visited in the production environment. However, a coverage of 65% in the testing environment indicates that 65% of the pages and/or links have been tested in the testing environment. Generally, the difference of 25% (a difference of 90% and 65%) may indicate a gap between the production and testing environments.

In some embodiments, test coverage computing platform 110 may receive, via the interactive graphical user interface, an indication of a selection of a selectable visual object associated with a link. Then, test coverage computing platform 110 may display a message from a service call associated with the link. For example, hovering over the link, clicking the link, and so forth, may display message from the service call associated with the link. For example, a message 230 may be displayed. In some instances, message 230 may display a service call and an error code associated with the service call. For example, "changePasscode: 207" may indicate that the service call "changePasscode" was executed and was partially successful. For example, the error code "207" may indicate that although the service call for "changePasscode" was successful, the echo was not detected. As another example, the error code "200" in "RetrieveSecurityKeySecurityCenter: 200" may indicate that the service call "RetrieveSecurityKeySecurityCenter" was executed successfully. Another example of an error code may be "500" that may indicate that the system is down.

In some embodiments, test coverage computing platform 110 may receive, via the interactive graphical user interface, an indication of a selection of a selectable visual object associated with a node. Then, test coverage computing platform 110 may display, via the interactive graphical user interface, a portion of the code associated with the node. Generally, test coverage computing platform 110 may display a portion of the code associated with a link or a node. Accordingly, when a page corresponding to a node has not been tested, a developer may review the code portion via the graphical user interface. Also, for example, if a link is associated with a failed service call, then the developer may review the code portion via the graphical user interface to identify potential errors in the code.

In some embodiments, test coverage computing platform 110 may receive, via the interactive graphical user interface, an indication of a selection of a selectable visual object associated with a link. Then, test coverage computing platform 110 may display, for a user and a session and via the interactive graphical user interface, a session activity graph indicating user activity during the session. In some embodiments, although a service call associated with a link may fail, an analysis of the user activity during the session may need to be analyzed. Accordingly, the session activity graph may be generated. The session activity graph may comprise nodes corresponding to pages, and edges corresponding to links between pages, and blocks that may provide information for service calls associated with the link.

Figure 3:
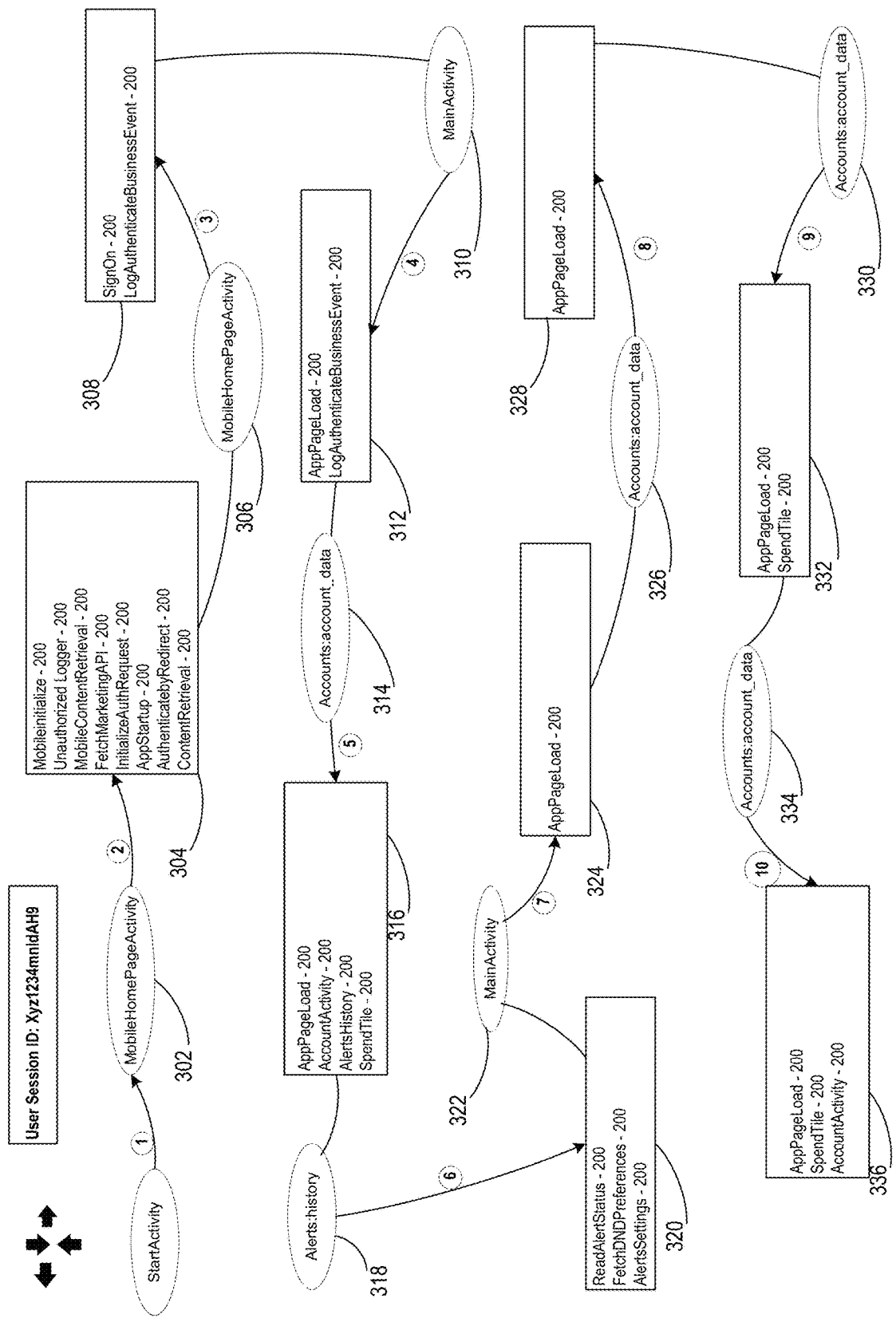
FIG. 3 depicts an illustrative user session activity graph for machine learning based test coverage in a production environment.

FIG. 3 depicts an illustrative user session activity graph for machine learning based test coverage in a production environment. As indicated, the session activity graph is illustrated with oval-shaped nodes that indicate a screen or page that a customer is visiting, a rectangular box that includes information about one or more service calls along with error codes, and edges that link the oval-shaped nodes, indicating navigation links between screens or pages. As indicated, the user and the session may be associated with a session identifier, such as, "xyz1234mnldAH9." The user may begin at a node "StartActivity," and at link 1, may navigate to a screen corresponding to MobileHomePageActivity 302. Then, the user may navigate, via link 2, to a screen corresponding to MobileHomePageActivity 306. The service calls associated with link 2 may be provided in block 304. In some instances, MobileHomePageActivity 302 and MobileHomePageActivity 306 may be the same screen. For example, a user may have selected a tab or a link on MobileHomePageActivity 302 that may land the user back to the same screen.

The user may then navigate, via link 3, to MainActivity 310, and the service calls associated with link 3 may be provided in block 308. Subsequently, the user may navigate from MainActivity 310 to Accounts:account_data 314 via link 4, and the service calls associated with link 4 may be provided in block 312. Then, the user may navigate to AlertsHistory 318 via link 5, and the service calls associated with link 5 may be provided in block 316. For example, service calls may include, AppPageLoad, AccountActivity, AlertsHistory, and SpendTile. Also, for example, an error code of 200 indicates that the service calls were successfully executed.

From AlertsHistory 318, the user may navigate, via link 6, to MainActivity 322, and the service calls associated with link 6 may be provided in block 320. Next, the user may navigate to Accounts:account_data 326 via link 7, and the service calls associated with link 7 may be provided in block 324. Subsequently, the user may select a page upload activity to navigate to the same screen Accounts:account_data 330 via link 8, and the service calls associated with link 8 may be provided in block 328. Then, the user may navigate to Accounts:account_data 334 via link 9, and the service calls associated with link 9 may be provided in block 332. Finally, the user may traverse link 10 with associated service calls listed in block 336.

Generally, the session activity graph may provide detailed information about a user activity during a single session. Accordingly, a developer may be able to quickly review the session activity graph to detect errors. In some embodiments, test coverage computing platform 110 automatically determine, based on an error code, a possible service call that may have caused an error.

In some embodiments, test coverage computing platform 110 may update, based on the first log data, the production navigational graph. For example, as a user uses the software application in the production environment, real-time log data may be retrieved. Accordingly, test coverage computing platform 110 may update, based on the first log data, the production navigational graph. Likewise, as changes are made to a code in the testing environment, test coverage computing platform 110 may retrieve second log data, and may update, based on the second log data, the testing navigational graph. Subsequently, test coverage computing platform 110 may update, based on the updated production navigational graph and the updated testing navigational graph, the coverage graph. Generally, first log data may be updated in real-time or near real-time. In some embodiments, first log data may be updated hourly, daily, and so forth. Developers, though may work on a project for a longer period of time, say, 3 months, or 6 months. Accordingly, the second log data may be updated at longer time intervals.

Generally, a machine learning model may be trained to detect patterns in first log data and second log data based on types of devices, operating systems, types of users, types of applications, types of accounts, volume of traffic, location of users, and so forth. For example, a K-Means clustering algorithm may be utilized to detect such patterns.

In some embodiments, test coverage computing platform 110 may train the machine learning model to determine a first link score indicative of a number of times the given link is traversed in the production environment, and a second link score indicative of a number of times the given link is associated with an error in the production environment. For example, the machine learning model may first classify the activity based on the patterns detected, and may then identify a significance of a link in the production environment by determining a number of times the link is traversed in the production environment. Also, for example, the machine learning model may determine a strength of a link in the production environment by determining a number of failed service calls associated with the link.

Then, test coverage computing platform 110 may execute an error correction strategy based on the first link score and the second link score. For example, a link with a high first link score may be prioritized as a highly significant link, and a link with a high second link score may be prioritized as a highly vulnerable link. An "error correction strategy" as used herein generally indicates a prioritization of testing and/or debugging activities for pages and/or links. Accordingly, in some embodiments, a link with a high first link score and a high second link score may be prioritized higher in an error correction strategy.

As described with reference to the scores for links, similar scores may be determined for webpages (or screens or pages). For example, test coverage computing platform 110 may associate, with a given webpage of the one or more webpages and based on a pattern of traffic for the one or more webpages, a first webpage score indicative of a number of times the given webpage is visited in the production environment. Then, test coverage computing platform 110 may associate, with the given webpage, a second webpage score indicative of a number of times the given webpage is associated with an error in the production environment. Subsequently, test coverage computing platform 110 may execute an error correction strategy based on the first webpage score and the second webpage score.

As described with reference to the error correction strategy for links, a similar strategy may be applied to webpages (or screens or pages). For example, test coverage computing platform 110 may train a machine learning model to determine a first webpage score indicative of a number of times the given webpage is visited in the production environment, and a second webpage score indicative of a number of times the given webpage has an error in the production environment. Then, test coverage computing platform 110 may execute an error correction strategy based on the first webpage score and the second webpage score.

Figure 4:
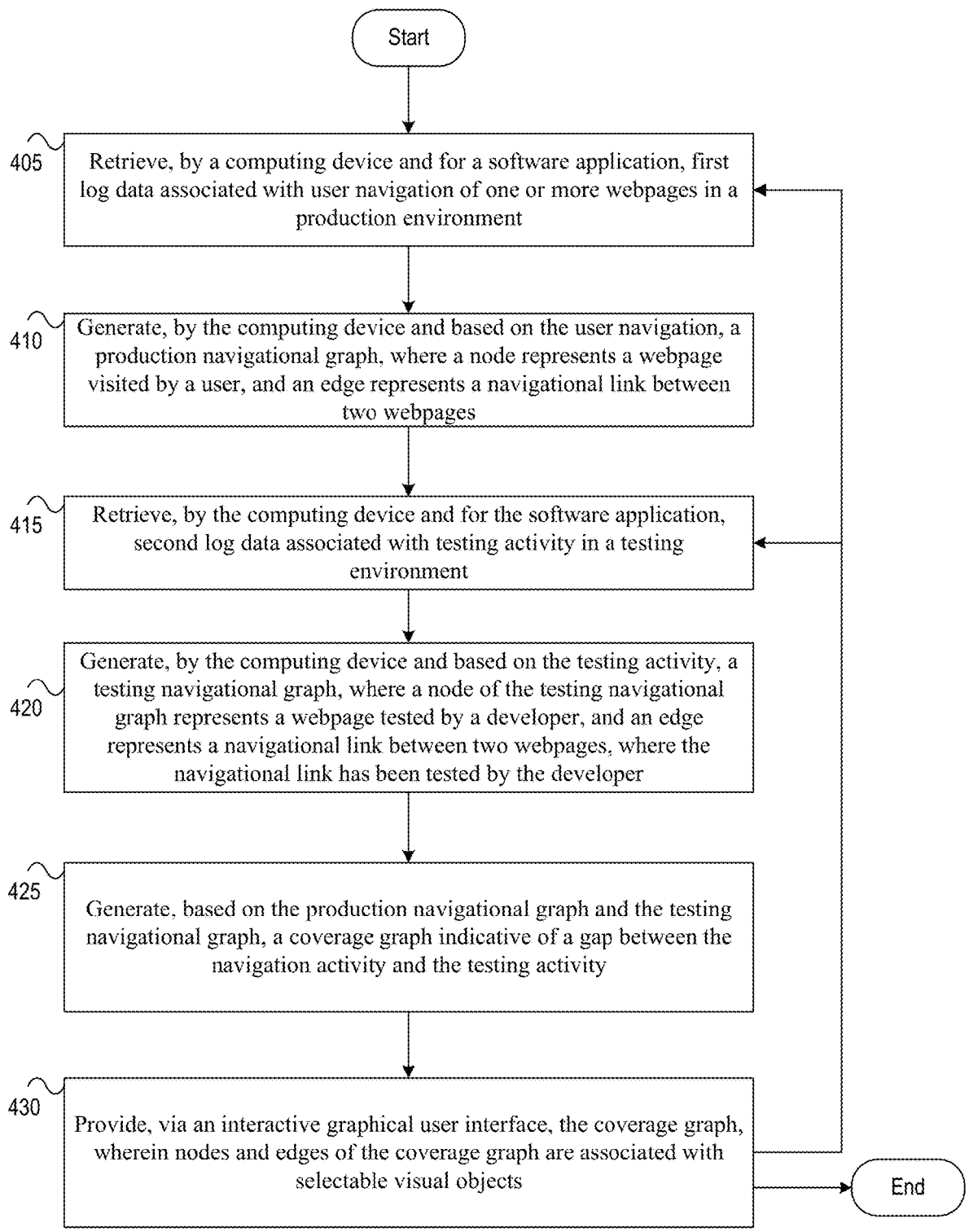
FIG. 4 depicts an illustrative method for machine learning based test coverage in a production environment.

FIG. 4 depicts an illustrative method for machine learning based test coverage in a production environment. Referring to FIG. 4, at step 405, a test coverage computing platform 110, having at least one processor, and memory storing computer-readable instructions that, when executed by the at least one processor, cause test coverage computing platform 110 to retrieve, by a computing device and for a software application, first log data associated with user navigation of one or more webpages in a production environment. At step 410, test coverage computing platform 110 may generate, by the computing device and based on the user navigation, a production navigational graph for the software application, where a node of the production navigational graph may represent a webpage visited by a user, and an edge between two nodes may represent a navigational link between two webpages visited by the user. At step 415, test coverage computing platform 110 may retrieve, by the computing device and for the software application, second log data associated with testing activity in a testing environment. At step 420, test coverage computing platform 110 may generate, by the computing device and based on the testing activity, a testing navigational graph for the software application, where a node of the testing navigational graph may represent a webpage tested by a developer, and an edge between two nodes may represent a navigational link between two webpages, where the navigational link has been tested by the developer.

At step 425, test coverage computing platform 110 may generate, based on the production navigational graph and the testing navigational graph, a coverage graph indicative of a gap between the navigation activity and the testing activity. At step 430, test coverage computing platform 110 may provide, via an interactive graphical user interface, the coverage graph, wherein nodes and edges of the coverage graph are associated with selectable visual objects. In some embodiments, the process may return to step 405 to retrieve additional first log data and update the production navigational graph. In some embodiments, the process may return to step 415 to retrieve additional second log data and update the testing navigational graph.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor; and
memory storing computer-readable instructions that, when executed by the at least one processor, cause the computing platform to:
retrieve, by a computing device and for a software application, first log data associated with user navigation activity in one or more webpages in a production environment;
generate, by the computing device and based on the user navigation activity, a production navigational graph for the software application, wherein a node of the production navigational graph represents a webpage visited by a user, and an edge between two nodes represents a navigational link between two webpages visited by the user;
retrieve, by the computing device and for the software application, second log data associated with testing activity in a testing environment;
generate, by the computing device and based on the testing activity, a testing navigational graph for the software application, wherein a node of the testing navigational graph represents a webpage tested by a developer, and an edge between two nodes represents a navigational link between two webpages, wherein the navigational link has been tested by the developer;
generate, using a machine learning model, based on the production navigational graph and the testing navigational graph, a coverage graph indicative of a gap between the user navigation activity and the testing activity; and
provide, via an interactive graphical user interface, the coverage graph, wherein nodes and edges of the coverage graph are associated with selectable visual objects.

2. The computing platform of claim 1, wherein the instructions comprise additional computer-readable instructions that, when executed by the at least one processor, cause the computing platform to:
detect, in the coverage graph, a node visited by the user in the production environment and not tested by the developer in the testing environment; and
display, by the computing device, the detected node with a first color.

3. The computing platform of claim 2, wherein the instructions comprise additional computer-readable instructions that, when executed by the at least one processor, cause the computing platform to:
determine that the detected node has been subsequently tested by the developer; and
display, by the computing device, the detected node with a second color different from the first color.

4. The computing platform of claim 1, wherein the instructions comprise additional computer-readable instructions that, when executed by the at least one processor, cause the computing platform to:
detect, in the coverage graph, a link visited by the user in the production environment, wherein the link is associated with an error in the production environment; and
display, by the computing device, the detected link with a first color indicating the error.

5. The computing platform of claim 4, wherein the instructions comprise additional computer-readable instructions that, when executed by the at least one processor, cause the computing platform to:
determine that the error associated with the detected link has been subsequently corrected by the developer; and
display, by the computing device, the detected link with a second color different from the first color.

6. The computing platform of claim 1, wherein the instructions comprise additional computer-readable instructions that, when executed by the at least one processor, cause the computing platform to:
receive, via the interactive graphical user interface, an indication of a selection of a selectable visual object associated with a link; and
display a message from a service call associated with the link.

7. The computing platform of claim 1, wherein the instructions comprise additional computer-readable instructions that, when executed by the at least one processor, cause the computing platform to:
receive, via the interactive graphical user interface, an indication of a selection of a selectable visual object associated with a link; and
display, for a user and a session and via the interactive graphical user interface, a session activity graph indicating user activity during the session.

8. The computing platform of claim 1, wherein the instructions comprise additional computer-readable instructions that, when executed by the at least one processor, cause the computing platform to:
receive, via the interactive graphical user interface, an indication of a selection of a selectable visual object associated with a node; and
display, via the interactive graphical user interface, a portion of a code associated with the node.

9. The computing platform of claim 1, wherein the instructions comprise additional computer-readable instructions that, when executed by the at least one processor, cause the computing platform to:
display, via the interactive graphical user interface, a coverage score indicative of the gap between the user navigation activity in the production environment and the testing activity in the testing environment.

10. The computing platform of claim 1, wherein the instructions comprise additional computer-readable instructions that, when executed by the at least one processor, cause the computing platform to:
associate, with a given link of a plurality of links between the one or more webpages and based on a pattern of traffic for the plurality of links, a first link score indicative of a number of times the given link is traversed in the production environment;
associate, with the given link, a second link score indicative of a number of times the given link has an error in the production environment; and
execute an error correction strategy based on the first link score and the second link score.

11. The computing platform of claim 1, wherein the instructions comprise additional computer-readable instructions that, when executed by the at least one processor, cause the computing platform to:
train the machine learning model to determine:
a first link score indicative of a number of times a given link is traversed in the production environment, and
a second link score indicative of a number of times the given link is associated with an error in the production environment; and
execute an error correction strategy based on the first link score and the second link score.

12. The computing platform of claim 1, wherein the instructions comprise additional computer-readable instructions that, when executed by the at least one processor, cause the computing platform to:
associate, with a given webpage of the one or more webpages and based on a pattern of traffic for the one or more webpages, a first webpage score indicative of a number of times the given webpage is visited in the production environment;
associate, with the given webpage, a second webpage score indicative of a number of times the given webpage is associated with an error in the production environment; and
execute an error correction strategy based on the first webpage score and the second webpage score.

13. The computing platform of claim 1, wherein the instructions comprise additional computer-readable instructions that, when executed by the at least one processor, cause the computing platform to:
train the machine learning model to determine:
a first webpage score indicative of a number of times the given webpage is visited in the production environment, and
a second webpage score indicative of a number of times the given webpage has an error in the production environment; and
execute an error correction strategy based on the first webpage score and the second webpage score.

14. The computing platform of claim 1, wherein the instructions comprise additional computer-readable instructions that, when executed by the at least one processor, cause the computing platform to:
detect, by the computing device and based on the gap, one or more of a webpage or a link that was not tested in the testing environment.

15. The computing platform of claim 1, wherein the instructions comprise additional computer-readable instructions that, when executed by the at least one processor, cause the computing platform to:
detect, by the computing device and based on the gap, a link that was not identified in the testing environment.

16. The computing platform of claim 1, wherein the instructions comprise additional computer-readable instructions that, when executed by the at least one processor, cause the computing platform to:
update, based on the first log data, the production navigational graph;
update, based on the second log data, the testing navigational graph; and
update, based on the updated production navigational graph and the updated testing navigational graph, the coverage graph.

17. The computing platform of claim 1, wherein the production environment and the testing environment are based on one or more of: a type of service, a type of user, and a type of computing device.

18. A method, comprising:
at a computing platform comprising at least one processor, and memory:
retrieving, by a computing device and for a software application, first log data associated with user navigation activity in one or more webpages in a production environment;
generating, by the computing device and based on the user navigation activity, a production navigational graph for the software application, wherein a node of the production navigational graph represents a webpage visited by a user, and an edge between two nodes represents a navigational link between two webpages visited by the user;
retrieving, by the computing device and for the software application, second log data associated with testing activity in a testing environment;
generating, by the computing device and based on the testing activity, a testing navigational graph for the software application, wherein a node of the testing navigational graph represents a webpage tested by a developer, and an edge between two nodes represents a navigational link between two webpages, wherein the navigational link has been tested by the developer;
analyzing, based on the production navigational graph and the testing navigational graph, a gap between the user navigation activity and the testing activity;
generating, using a machine learning model, based on analyzing, a coverage graph indicative of the gap; and
providing, via an interactive graphical user interface, the coverage graph, wherein nodes and edges of the coverage graph are associated with selectable visual objects.

19. The method of claim 18, further comprising:
detecting, by the computing device and based on the gap, one or more of a webpage or a link that was not tested in the testing environment.

20. One or more non-transitory computer-readable media storing instructions that, when executed by a computing platform comprising at least one processor, and memory, cause the computing platform to:
retrieve, in real-time and by a computing device and for a software application, first log data associated with user navigation activity in one or more webpages in a production environment;
generate, by the computing device and based on the user navigation activity, a production navigational graph for the software application, wherein a node of the production navigational graph represents a webpage visited by a user, and an edge between two nodes represents a navigational link between two webpages visited by the user;

retrieve, by the computing device and for the software application, second log data associated with testing activity in a testing environment;

generate, by the computing device and based on the testing activity, a testing navigational graph for the software application, wherein a node of the testing navigational graph represents a webpage tested by a developer, and an edge between two nodes represents a navigational link between two webpages, wherein the navigational link has been tested by the developer;

generate, using a machine learning model, based on the production navigational graph and the testing navigational graph, a coverage graph indicative of a gap between the user navigation activity and the testing activity; and provide, via an interactive graphical user interface, the coverage graph, wherein nodes and edges of the coverage graph are associated with selectable visual objects.

* * * * *

UNITED STATES PATENT AND TRADEMARK OFFICE
CERTIFICATE OF CORRECTION

PATENT NO. : 11,232,019 B1
APPLICATION NO. : 16/922227
DATED : January 25, 2022
INVENTOR(S) : Verma et al.

It is certified that error appears in the above-identified patent and that said Letters Patent is hereby corrected as shown below:

On the Title Page

Column 1, (22) Filed, Line 1:
After "2020", insert --¶(65) Prior Publication Data
US 2022/0012167 A1 Jan. 13, 2022--

Signed and Sealed this
Nineteenth Day of April, 2022

Katherine Kelly Vidal
*Director of the United States Patent and Trademark Office*